(12) United States Patent
Wiesenberg

(10) Patent No.: US 6,987,584 B1
(45) Date of Patent: Jan. 17, 2006

(54) METHOD AND SYSTEM FOR PREVENTING ARTIFACTS THAT MAY BE PRODUCT WHEN BOTTLING PDL FILES CONVERTED FROM RASTER IMAGES

(75) Inventor: Raphael Wiesenberg, Ramat Gan (IL)

(73) Assignee: Ether Visuals LLC, Las Vegas, NV (US)

( * ) Notice: Subject to any disclaimer, the term of this patent is extended or adjusted under 35 U.S.C. 154(b) by 921 days.

(21) Appl. No.: 09/635,244

(22) Filed: Aug. 9, 2000

Related U.S. Application Data

(60) Provisional application No. 60/147,478, filed on Aug. 9, 1999.

(51) Int. Cl.
H04N 1/56 (2006.01)
H04N 1/58 (2006.01)
G06K 15/00 (2006.01)

(52) U.S. Cl. ............. 358/1.9; 358/3.26; 358/1.18; 358/530; 358/537

(58) Field of Classification Search ............ 358/1.9, 358/3.26, 1.13, 1.18; 382/180, 275; 715/530, 715/911
See application file for complete search history.

(56) References Cited

U.S. PATENT DOCUMENTS

| | | | | |
|---|---|---|---|---|
| 5,790,708 A | * | 8/1998 | Delean | 382/302 |
| 6,295,133 B1 | * | 9/2001 | Bloomquist et al. | 358/1.13 |
| 6,594,034 B1 | * | 7/2003 | Bloomquist et al. | 358/1.18 |
| 6,661,919 B2 | * | 12/2003 | Nicholson et al. | 382/180 |
| 2002/0054398 A1 | * | 5/2002 | Bloomquist et al. | 358/529 |

* cited by examiner

Primary Examiner—Scott A. Rogers
(74) Attorney, Agent, or Firm—Berkeley Law & Technology Group, LLC

(57) ABSTRACT

The present invention eliminates undesirable image defects caused during the preparation of pages for printing and folding, known as the bottling process. This is achieved by analyzing image characteristics, sorting out the image according to its characteristics, where necessary vectoring and editing the vectored characteristics, and finally completing the file conversion from a raster image to a Page Description Language (PDL) image. A first embodiment of the invention divides an image into small segments. A second embodiment of the invention enlarges existing image segments. A third embodiment of the invention enlarges existing image segments and sorts image segments according to their color attribute of transparency. A fourth embodiment of the invention divides a part of an image segment to small segments.

7 Claims, 8 Drawing Sheets

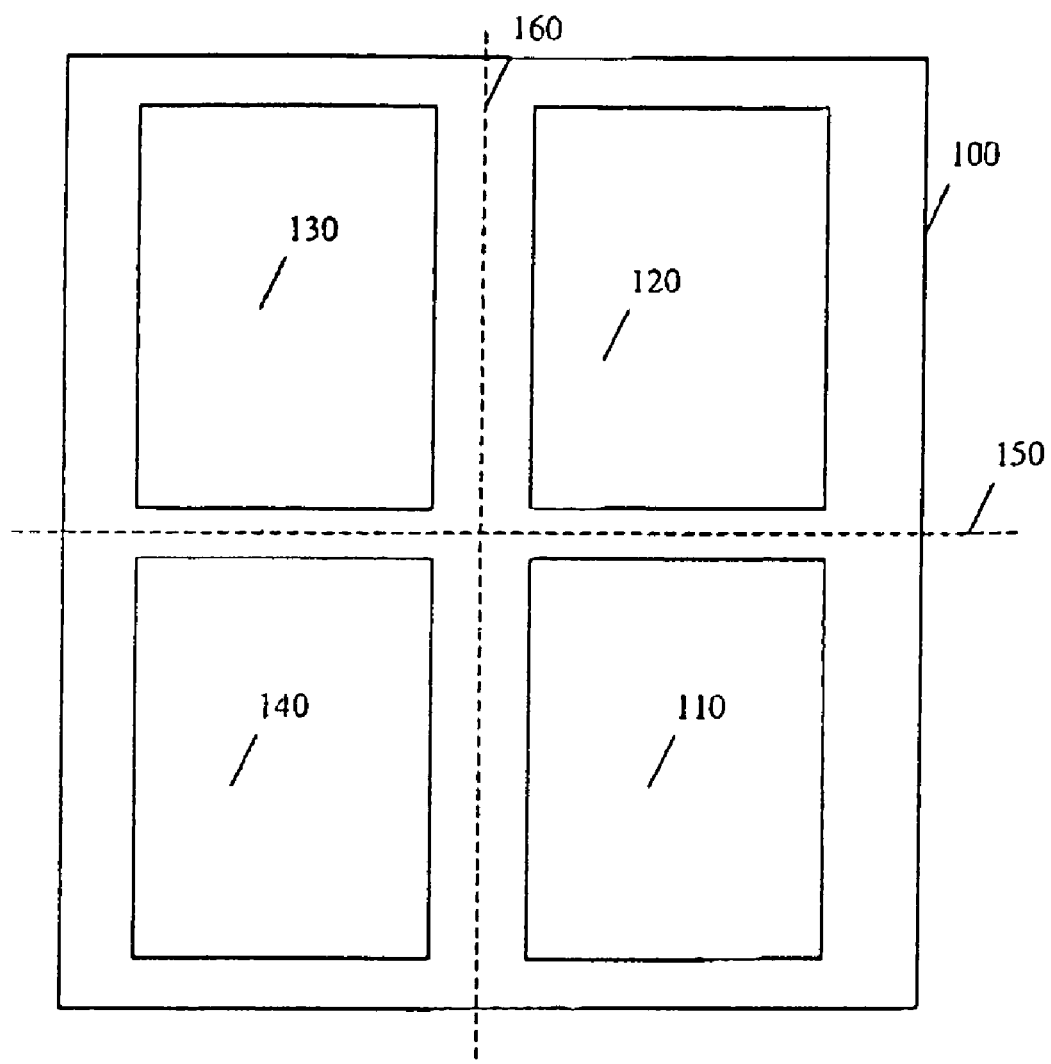
Fig. 1 (Imposition and folding)

Fig. 2a (Shapes before rotation)
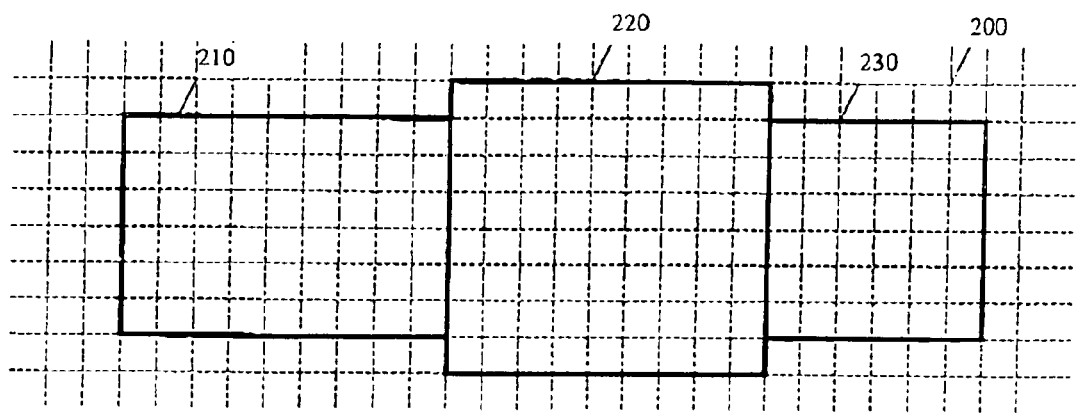
Fig. 2b (Shapes before rotation)
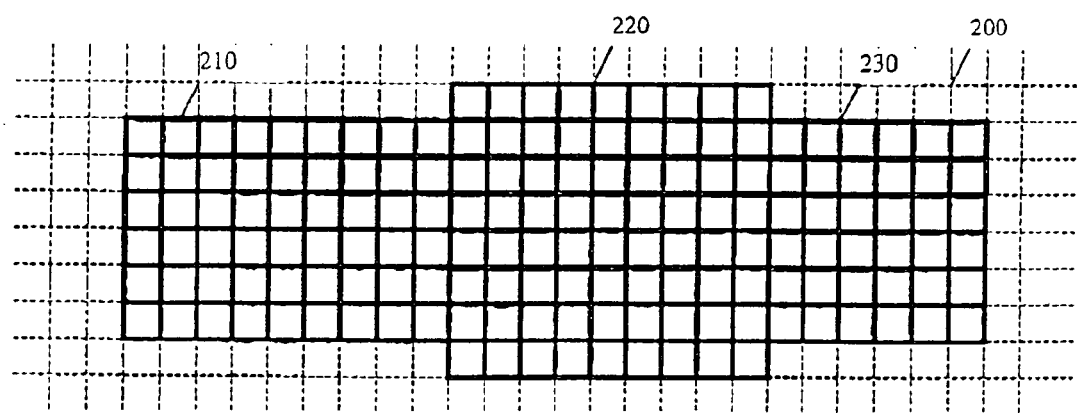

Fig. 3 (Shapes after rotation)
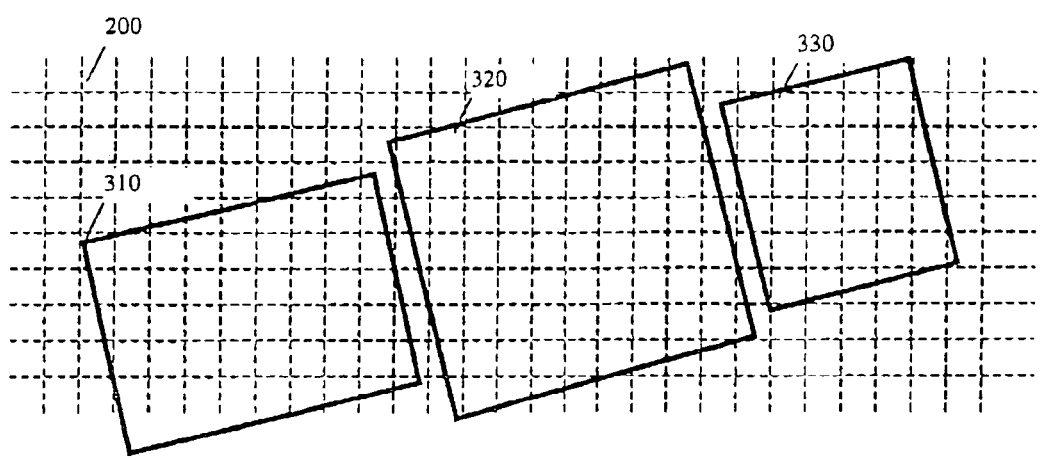

Fig. 4 (Shapes after enlargement)
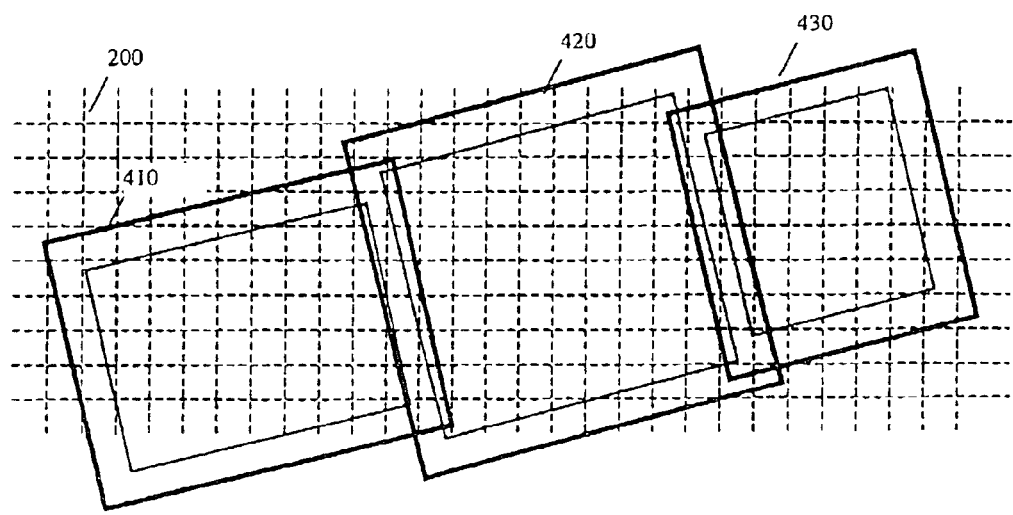

Fig. 5a (Shapes in order)
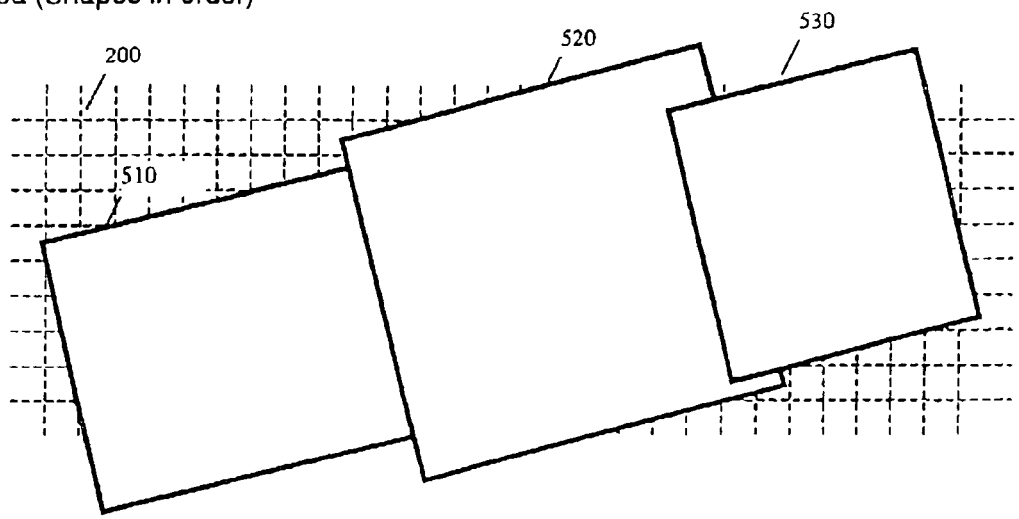
Fig. 5b (Shapes in order)
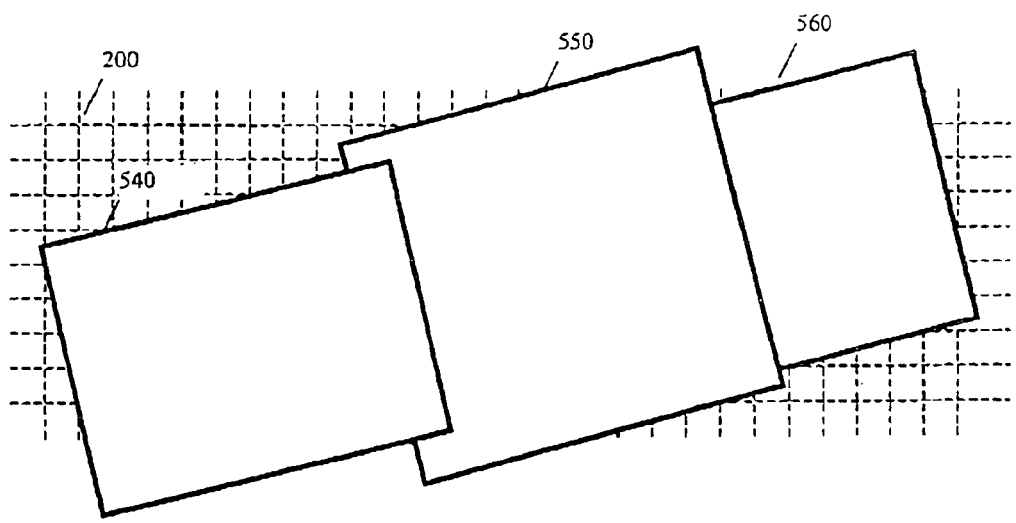

Fig. 6 (Color and Transparency)

| INK : NO. | NAME | % COVERAGE | TRANSPARENCY |
|---|---|---|---|
| 1 | CYAN | 100 | 0 |
| 2 | MAGENTA | 2 | 1 |
| 3 | YELLOW | 0 | 0 |
| 4 | BLACK | 1 | 1 |
|  | TOTAL | 100 | 2 |

Fig. 7a (4th embodiment)
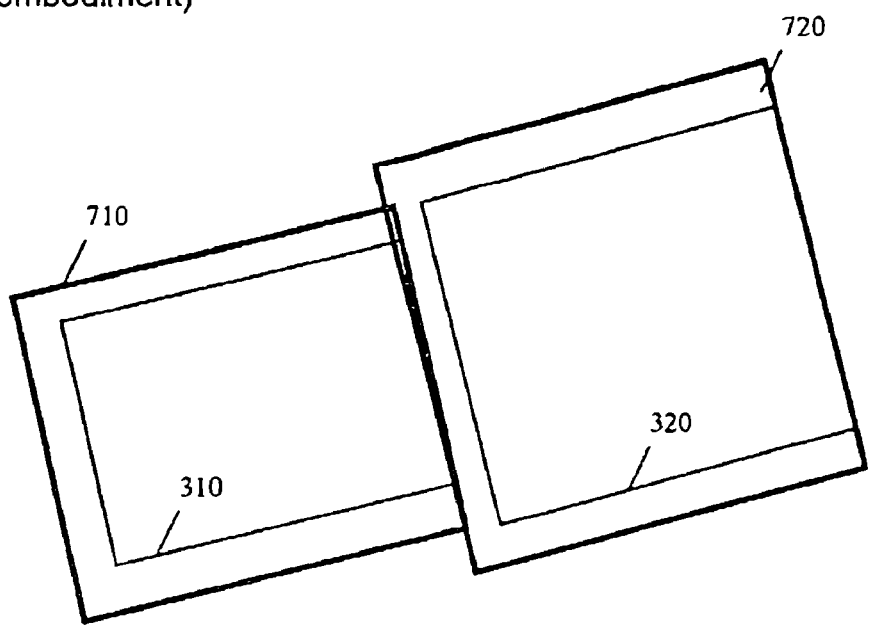
Fig. 7b (4th embodiment)
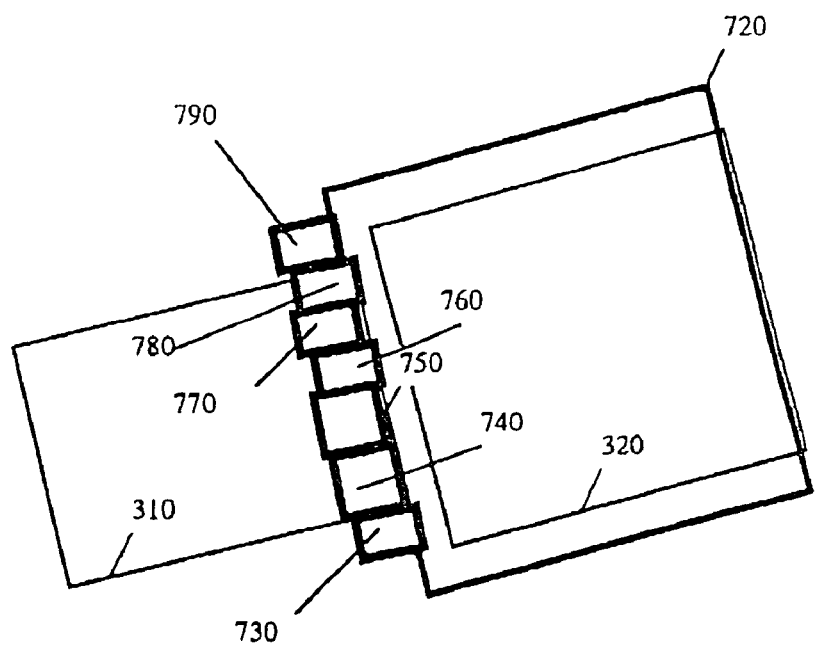

METHOD AND SYSTEM FOR PREVENTING ARTIFACTS THAT MAY BE PRODUCT WHEN BOTTLING PDL FILES CONVERTED FROM RASTER IMAGES

This application claims benefit of U.S. Provisional 60/147,478, filed Aug. 9, 1999.

FIELD AND BACKGROUND OF THE INVENTION

The invention relates to the field of Pre-Press or Graphic Arts that involves the preparation of images for print. This industry nowadays usually employs digital computers and it processes images coded as files of digital data. These image files usually fall into two categories, raster files and vector files. Raster files describe an image as a two dimensional array of picture elements called pixels. A pixel contains the attribute of image color at its particular location within the image. Usually all pixel comprising an image are assumed to be rectangular, and of the same dimensions. Vector files describe an image in terms of various geometrical shapes such as a line segment or a polygon. The specification of these shapes contains the attributes of color of each shape, and its dimensions. A well-known page description language (PDL) language comprising vector description of images is Postscript.

It is a common practice in the industry to convert images between raster and vector formats. The process of conversion of a file from Postscript to a raster format is often called RIP (Raster Image Processing). The process of conversion from raster to Postscript is herein called Ceps2Ps.

The target of a Pre-Press image processing activity is, by definition, the conversion of the image from digital form to an analogue form of ink or toner on paper or other substrate. A printing press is a common device for printing ink on paper, and so it is often stands at the end of a Pre-Press activity. The press often produces large sheets of paper on each of which several distinct images are printed. Post-press activity is then often required to cut, fold and bind these sheets of paper to form printed booklets. One such large sheet of paper can be turned by this Post-press activity to a booklet of several pages each containing one of these distinct images as the printed content of the page.

It is a known by-product of the Post-press process that the distinct images get rotated one in respect to the other by a small angle. When a press produces a sheet of paper with several distinct images that are not rotated one in respect to the other, they will appear rotated in the resulting booklet. This byproduct of the Post-press process is sometimes and herein called 'bottling'. It is a common practice to correct the image orientation using the Pre-press process to correct for bottling that is expected to occur at Post-press, so that correct orientation would be observed for the booklets. The image processing function of rotation is generally well known and commonly used in the art.

It, thus, may happen that an image coded in some raster format needs to be passed through the following Pre-press process. At a first step, the raster image is converted to Postscript format. Then, at a second step, the Postscript coded image is rotated by a small angle. Finally, at a third step, a RIP operation produces raster pixels for printing.

It is common for an image to contain straight line segment elements that are either precisely horizontal or precisely vertical, i.e. line segments that exactly parallel to either horizontal or vertical edges of the page on which the are printed. Thus its is common for the second step of rotation to produce line segments that form a small angle to either vertical or horizontal directions. These segments are called 'typical bottling segments' herein.

An inherent and common behavior of the RIP has been observed when it converts typical bottling segments to raster format as follows. Undesirable artifacts are produced that appear as cracks within the image and between typical bottling segments.

It is not desirable to prevent the appearance of the undesirable artifacts by introducing changes in the behavior of the RIP, because a corrected RIP would behave differently than other RIP products in the industry, and it is required that all RIP products within the industry behave in a similar fashion. Otherwise the industry will prefer to avoid using the Postscript format altogether.

The present invention seeks to prevent the appearance of the undesirable artifacts by introducing changes to the Ceps2Ps operation.

The invention is suitable for a particular Ceps2Ps method of operation as follows. Ceps2 ps divides a raster image into segments of like color. Each segment is than described as a geometrical shape such as a polygon in the syntax of Postscript. The invention seeks to eliminate the undesirable effect of the appearance of cracks, or gaps between these segments.

Appendix A lists sample Postscript code generated by a Ceps2Ps function. This code contains examples of some polygon image segments, and in this sample they are rectangular.

A full description of the language is given, for example, in "PostScript Language Reference Manual", Second Edition, by Adobe System Incorporated, Addison-Wesley Publishing Company, ISBN 0-210-18127-4, herein named The Red Book.

Note that lines begin with the character '%' are comments in the language. Such lines do not translate to any image elements. Some comment lines are used herein to mark areas of interest within the Postscript code. Comments are described in Page 27 in Section 3.2.2 in The Red Book.

Under the line "% item 1" there is listed a first example of an image element composed of three rectangles. Note the use of the "setcmykcolor" command explained in Page 496 in The Red Book, and the use of the "rectfill" command explained in Page 473 in The Red Book. Roughly explained, "setcmykcolor" specifies a color composed of cyan, magenta, yellow and black ink, and "rectfill" fills a rectangular shape with that color. Note that the first rectangle has no transparent colors at all, the second rectangle has one transparent color, and the third has two transparent colors.

Under the line "% item 2" there is listed a second example of an image element composed of two rectangles. Note that they are smaller in size relative to the rectangles described above.

SUMMARY OF THE INVENTION

A first preferred embodiment of the invention sets the size of the segments of like color in a given Ceps2ps operation to a minimum such as the size of one pixel in each of the two image dimensions. Therefore the image is made to be described as composed of a large number of segments, and each segment is small in size.

A second preferred embodiment of the invention increases the size of the segments of like color in a given Ceps2ps operation by a small amount such as the size of one in each of the two image dimensions. Therefore the number of segments describing an image does not change, but some segments are made to be a little larger.

A third preferred embodiment of the invention comprises two steps. The first step of the third preferred embodiment of the invention increases the size of the segments of like color in a given Ceps2ps operation by a small amount such as the size of one in each of the two image dimensions. The second step of the third preferred embodiment of the invention sorts the segments according to their color content. This step produces a list of segments in which the segments having a larger number of transparent separations are rendered before segments having a smaller number of transparent separations. Therefore the segments having a larger number of transparent separations are listed before segments having a smaller number of transparent separations, assuming that the PDL renders segments in the order in which they are listed.

A fourth preferred embodiment of the invention decompose segments of like color in a given Ceps2ps operation to core parts and border parts, and divides the border parts into segments of a small size such as the size of one pixel in each of the two image dimensions.

BRIEF DESCRIPTION OF THE DRAWINGS

FIG. 1 depicts a relatively large sheet of paper 100, in which four relatively small distinct images 110, 120, 130 and 140 are printed. The sheet is then folder along dashed lines 150 and 160 (that are not necessarily actually printed on the paper) and folder to form a four page booklet. Some other four distinct images may be printed on the backside of the sheet of paper. The backside is not shown in the figure. The invention seeks to eliminate artifacts caused by the rotation at a small angle of images 110, 120, 130 and 140 relative to 100, 150, 160 and to each other.

FIG. 2a depicts three rectangular segments 210, 220 and 230 that together form a continuous shape. The shape is depicted against a grid of dashed lines 200 that indicates individual pixels in a raster format. Grid 200 does not in itself get printed and is not an image element.

FIG. 2b decomposes the same three rectangular segments into squares of the size of one pixel.

FIG. 3 depicts the same three rectangular segments depicted in FIG. 2, against the same Grid 200. The three rectangular segments are rotated in a small angle relative to Grid 200, and thus they form rotated shapes 310, 320 and 330 respectively. The angle of rotation is exaggerated in the figure relative to common practice. Usually the angle is actually small, but the figure shows it as big, for demonstration purpose only. Gaps are shown between 310 and 320, and between 320 and 330. These may lead to cracks in the image that are an undesirable effect caused by the RIP.

FIG. 4 depicts the same three rotated segments depicted in FIG. 3, against the same Grid 200. The three rectangular segments 410, 420, and 430 are larger by a small amount (about one pixel) then 310, 320 and 330, and so no gaps are present between them. Shapes 410, 420 and 430 correspond to 310, 320 and 330 respectively.

FIGS. 5a and 5b depict the same three rotated and enlarged segments depicted in FIG. 4, against the same Grid 200. The importance of order of rendering of segments is explained by comparing 5a to 5b. Shapes 510, 520 and 530 in FIG. 5a correspond to shapes 540, 550 and 560 in FIG. 5b, and also to shapes 410, 420 and 430 in FIG. 4 respectively.

FIG. 6 described and example of color attributes of an image segments including the attribute of transparency, and including a calculated sum of the numerical color attributes over the separations or inks.

FIG. 7a depicts two of the three rotated and enlarged segments depicted in FIG. 3. and FIG. 4. The third rectangle is assumed to be a part of the image, but it is not drawn in FIG. 7a for clarity. Rotated rectangles 310 and 320 correspond to same shapes in FIG. 3. Enlarged and rotated rectangle 710 and 720 correspond to shapes 410 and 420 in FIG. 4 respectively. Comparing shapes 410 and 420 to shapes 710 and 720, it is seen that in FIG. 7a the enlargement does not include the boarder between image segments such as 310 and 320.

FIG. 7b. depicts again shapes 310 and 320. It also shows enlarged area 720, but it does not show enlarge area 710 for clarity.

Figure 8:
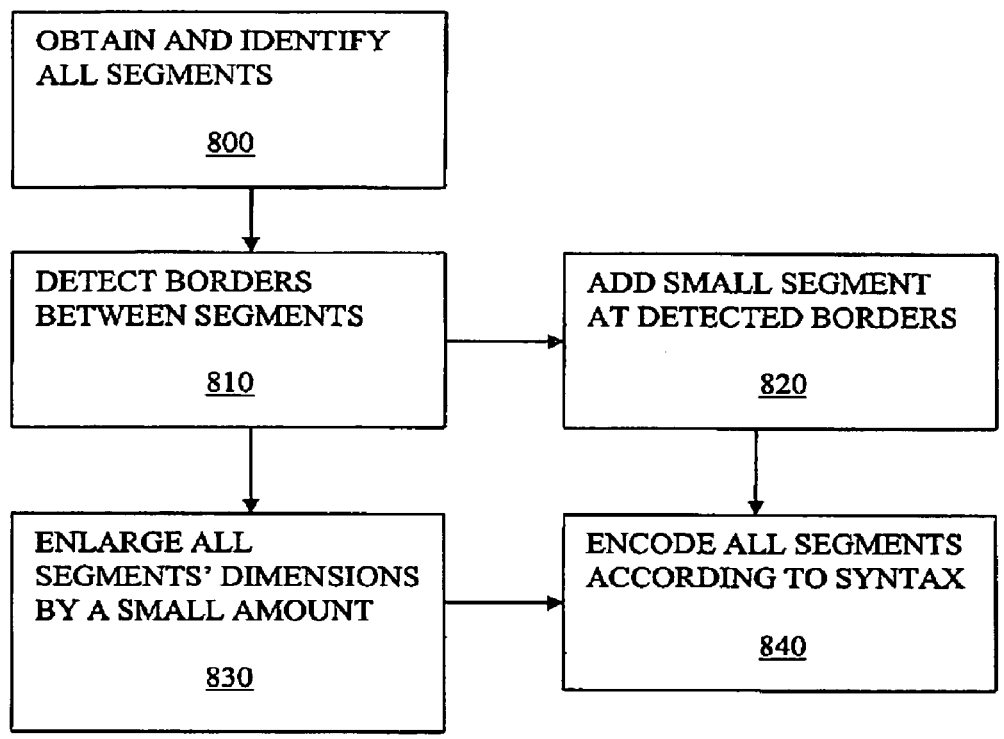

Small shapes 730, 740, 750, 760, 770, 780 and 790 are depicted at the border between shapes 310 and 320.

FIG. 8 depicts a Ceps2 ps converter comprising of the following steps. Step 800 identifies the image segments that are continuous collections of raster image pixels. Step 810 detects the boarders between the image segments. Step 820 adds small image segments at the detected boarders. Step 830 enlarges the original segments by a small amount. There is no need to perform this enlargement at the detected boarders. Step 840 composes all image segments, added or enlarged, to a file in the syntax of the target language such as Postscript.

DESCRIPTION OF THE PREFERRED EMBODIMENTS

There are four embodiments of the invention presented here. They represent four possible solutions to the problem of the appearance of the undesirable artifacts by introducing changes to the Ceps2Ps operation. These embodiments are described below in reference to Appendix B. This appendix lists sample Postscript code for an image. It describes the image of Appendix A after processing according to the various embodiments of the present invention.

To explain the terms "OneDevicePixWidth" and "OneDevicePixHeight" in Appendix B, reference is first made to the code under the line "% item 0" therein. The two terms are defined as equivalent to one image pixel in the resolution of the target printing device. The size of one such pixel is used herein as the preferred small amount. In some embodiments it is used as the size of a small element, and in some embodiments it is used as the amount of change in a size of an element. It is appreciated that other similar sizes can serve for the same purpose. For example, the size of two pixels may be good enough for many practical purposes.

The four embodiments are also described in reference to figures. The first embodiment is described in reference to FIG. 2a, the second embodiment is described in reference to FIG. 3, the third embodiment is described in reference to FIG. 4, and the fourth embodiment is described in reference to FIGS. 7a and 7b.

The first preferred embodiment of the invention sets the size of the segments of like color in a given Ceps2ps operation to a minimum such as the size of one pixel in each of the two image dimensions. Where, for example, three rectangular segments are enough to express the image, as shown in FIG. 2a, a Ceps2ps function acting according to the first embodiment produces 6 times 9 plus 8 times 9 plus 6 times 6, or 162 rectangular segments, each approximately one pixel high and one pixel wide. Referring to Appendix B, the effects of the first preferred embodiment of the present invention can be observed in the image segments under the line "% item 2".

The two rectangle that are described under "% item 2" in Appendix A, are partially divided in Appendix B into small rectangles of a small size of one pixel in each dimension.

This embodiment avoids some problems that arise in the other embodiments, but it is costly in terms of computational resources. This may be the embodiment of choice in the future, as these resources become very cheap.

A second preferred embodiment of the invention increases the size of the segments of like color in a given Ceps2ps operation by a small amount such as the size of one in each of the two image dimensions.

FIG. 3 depicts the situation without resorting to the invention. Gaps have formed between image rectangular segment 310 and 320, and between 320 and 330. These gaps are seldom larger than one pixel wide, but they are sometimes rendered and can be visible at the final printed product usually as cracks in dark colors behind which white or light color appears.

FIG. 4 explains how the second embodiment solves the problem by enlarging the segments to overlap and remove any chance of any apparent cracks in the final product. This causes some enlargement of the image feature described by the enlarged segments, but this enlargement is insignificant, and undetectable after rotation, as it is approximately one pixel wide. One method of enlargement is shown in Appendix B.

Referring to Appendix B, the effects of the second preferred embodiment of the present invention can be observed in the image segments under the line "% item 1". The three rectangles that are described under "% item 1" in Appendix A, are enlarged by a small amount of one pixel in each dimension. This is achieved using the Postscript commands "add" and "sub" for adding and subtracting an amount to and from the coordinates or size of a segment.

FIG. 6. aids in explaining a drawback of the second embodiment. Each image segment carries an attribute of color. Color is expressed as a set of numerical values corresponding to a set of inks or toners, or generally a set of separations to which the image is said to be separated. Some separations for some image segments may carry an attribute of transparency, indicating that the segment is not rendered but shows the underlying color in the specific transparent separation. FIG. 6. shows an example for color description of a segment. In this example the color description consists of four inks or separations named Cyan, Magenta, Yellow and Black. In this example the ink named cyan fully covers the underling media, so its ink coverage is 100%. In this example, the value 0 indicates no transparency, so the cyan ink is not transparent at all.

Also in the example described in FIG. 6., the inks named magenta and black do not fully cover the underling media. In this example, the value 1 indicates full transparency, so the magenta and black inks are transparent, and so their percentage of coverage is not reflected in the appearance of the resulting image.

Also in the example described in FIG. 6., the ink named yellow does not fully covers the underling media, and in fact it does not cover it at all. In this example is not transparent, and so its percentage of coverage is reflected in the appearance of the resulting image. In this case the color white may often be expected to be observed in the resulting image, where the relevant image segment is rendered, over any underlying color.

Finally, in FIG. 6., the total values may be calculated for an image segment over all its inks. The calculation of the total coverage may not include transparent color. In this example the total of the transparency value is the number of transparent inks, which is 2.

The second preferred embodiment is less computationally expensive than the first, but it is not suitable to cases including much transparent color. The enlargement of segment does not remove the undesirable effect of cracks if the enlarged area is transparent.

A third preferred embodiment of the invention comprises of two steps. A first step of the third preferred embodiment of the invention increases the size of the segments of like color in a given Ceps2ps operation by a small amount such as the size of one pixel in each of the two image dimensions. A second step of the third preferred embodiment of the invention sorts the segments according to their color content. The second step produces a list of segments in which the segments having a larger number of transparent separations are listed before segments having a smaller number of transparent separations.

The first and second steps comprise necessary steps in the embodiment, but they need not be taken in any particular order.

According to a first variant of the third embodiment, the first is taken before the second step, so sorting according to color occurs only after all segments have been increased in size.

According to a second variant of the third embodiment, the first is taken after the second step, so sorting all segments according to color occurs before any segment has been increased in size.

According to a third variant of the third embodiment, the first and second steps are taken in parallel, so size enlargement occurs during sorting.

The first step of the third embodiment has been explained herein above in reference to FIG. 4.

The second step is explained in reference to FIGS. 5a and 5b. It is a common and standard practice for a RIP to render shapes in the order in which they are present in the Postscript file that is processes to raster. When a first shape is recorded in the file before a second shape, then the second shape will be rendered on top of the first shape.

For example, and in reference to FIG. 5a, Shape 530 must a be recorded in the file after Shape 520 in order that Shape 530 be rendered as laying on top of Shape 520 as shown in FIG. 5a.

For example, and in reference to FIG. 5b, Shape 510 must a be recorded in the file after Shape 520 in order that Shape 510 be rendered as laying on top of Shape 520 as shown in FIG. 5b.

The third embodiment of the invention seeks to record image segments in some preferred order so that they are rendered in some preferred order.

A preferred order for rendering of image segments is any order that reduces the effect of the drawback of the second embodiment as explained herein above in reference to FIG. 6. The preferred order for rendering, according to the third embodiment of the invention is the order in which image segments having a large total transparency value, as defined in reference to FIG. 6, are rendered before image segments having a smaller total transparency value.

Referring to Appendix B, the effects of the third preferred embodiment of the present invention can be observed in the image segments under the line "% item 1".

The three rectangles that are described under "% item 1" in Appendix A, are enlarged by a small amount of one pixel in each dimension. The three rectangles appear in Appendix B in a particular order in which the rectangle having two transparent inks is listed first, and the rectangle having none is last. This is not their original order as in Appendix A, and so they have been sorted according to number of transparent inks.

By sorting image segments according to transparency, the third embodiment prevents most undesirable artifacts that are sometimes present with the second embodiment of the invention. The first embodiment prevents them all.

A fourth preferred embodiment of the invention decompose segments of like color in a given Ceps2ps operation to core parts and border parts, and divides the border parts into segments of a small size such as the size of one pixel in each of the two image dimensions.

Reference is now made to FIGS. 7a and 7b. A first step of the fourth embodiment of the present invention is the identification of borders between image segments. For example, the first step identifies the border between shapes 310 and 320.

A second step of the fourth embodiment of the present invention is the enlargement of the shapes. There is no need to enlarge the shapes at the borders between them. Therefore enlarged shapes 710 and 720 in FIG. 7a are smaller than enlarged shapes 410 and 420 in FIG. 4, and according to the second embodiment of the present invention.

A third step of the fourth embodiment of the present invention is the addition of small image segments along the boarders identified at the first step. For example, seven shapes: 730, 740 . . . 790 are added in FIG. 7b. Note that the shapes added at the second step roughly fill the are of the cross section of shapes 410 and 420 that represent the enlarged shapes according to the second embodiment of the present invention.

Referring to Appendix B, the effects of the fourth preferred embodiment of the present invention can be observed in the image segments under the line "% item 2".

To explain the terms "OneDevicePixWidth" and "OneDevicePixHeight" therein, reference is first made to the code under the line "% item 0" therein. The two terms are defined as equivalent to one image pixel in the resolution of the target printing device.

The two rectangle that are described under "% item 2" in Appendix A, are partially divided in Appendix B into small rectangles of a small size of one pixel in each dimension.

The small rectangles of Appendix B are marked only at the boarder between the two rectangles of Appendix A.

This embodiment avoids some problems that arise in the other embodiments, and it is not costly in terms of computational resources. This embodiment comprises a step of identification of boarders between shapes.

It is appreciated that an optimized Ceps2ps converter can be constructed that employs the fourth preferred embodiment of the present invention. This converter is a method or apparatus for the conversion of raster image to a vector image comprising the steps of detection of image segments among raster pixels of like color, detection of boarders between segments, and addition of small image segments along the detected boarders. It is depicted in FIG. 8.

What is claimed is:

1. A method for preventing the appearance of undesirable artifacts that may be produced when converting a raster image to a Page Description Language (PDL) image, by dividing the raster image into segments of like color and describing each segment in the syntax of the PDL, and then rendering the PDL image to raster format (ripping) while rotating the image data by a small angle (bottling), comprising the steps of:
   i. setting the size of each segment of like color to a minimum size in each of two image dimensions (height and width); and
   ii. converting said raster image to said PDL image.

2. A method for preventing the appearance of bottling artifacts while converting a raster image to a PDL image, comprising the steps of:
   i. increasing the size of each image segment of like color, which is to appear in said PDL image, by a small amount so that said segments overlap each other in each of the two image dimensions; and
   ii. converting said raster image to said PDL image.

3. A method for preventing the appearance of bottling artifacts while converting a raster image to a PDL image, comprising the steps of:
   i. increasing the size of segments of like color by a small amount; and
   ii. sorting said segments according to their color content.

4. The method of claim 3, wherein said sorting the segments further comprises:
   i. defining a number of transparent separations for the segment; and
   ii. sorting said segments in such a way so that said segments having a larger number of transparent separations appear before said segments having a smaller number of transparent separations.

5. A method for preventing the appearance of bottling artifacts while converting a raster image to a PDL image, comprising the steps of:
   i) identifying borders between adjoining image segments to appear in the PDL image;
   ii) increasing the height of each segment by a small amount, if no adjoining image segments appear below said segment;
   iii) adding new image segment or segments horizontally across said segment, if not enlarged in step ii), each new image segment having the same color value as said segment and a small size (H×W), in each of the two image dimensions, so that the totality of new image segments completely and exactly overlaps the lower area of said segment; and
   iv) increasing width of each segment by a small amount, if no adjoining image segments appear to the right of said segment; and
   v) adding new image segments vertically across said segment, if not enlarged in step iv), each new image segment having the same color value as said segment and a small size (H×W), in each of the two image dimensions, so that the totality of new image segments completely and exactly overlaps the left and/or right area of said segment.

6. A system for preventing the appearance of undesirable artifacts that may be produced when converting a raster image to a Page Description Language (PDL) image, by dividing the raster image into segments of like color and describing each segment in the syntax of the PDL, and then rendering the PDL image to raster format (ripping) while rotating the image data by a small angle (bottling), comprising:
   i. software means for analyzing, sorting, vectoring and editing said vectored raster image content while converting said raster image to a PDL image;
   ii. memory means for storing image characteristics and content changes; and iii. processing means for executing said image conversion based on said characteristics and said content changes.

7. The system of claim 6, wherein said software means controls activities selected from the group of activities consisting of setting the size of segments of like color to a minimum size, increasing the size of said segments of like color, enlarging said segments to overlap each other, calculating total ink values for an image segment, sorting said segments according to their color content, recording image segments in some preferred order, sorting image segments according to transparency, decomposing segments of like color to core parts and border parts, identifying borders between image segments, and adding small image segments along borders.

\* \* \* \* \*

UNITED STATES PATENT AND TRADEMARK OFFICE
CERTIFICATE OF CORRECTION

PATENT NO. : 6,987,584 B1
APPLICATION NO. : 09/635244
DATED : January 17, 2006
INVENTOR(S) : Raphael Wiesenberg It is certified that error appears in the above-identified patent and that said Letters Patent is hereby corrected as shown below:

First page, at (54), "METHOD AND SYSTEM FOR PREVENTING ARTIFACTS THAT MAY BE PRODUCT WHEN BOTTLING PDL FILES CONVERTED FROM RASTER IMAGES" should be changed to --METHOD AND SYSTEM FOR PREVENTING ARTIFACTS THAT MAY BE PRODUCED WHEN BOTTLING PDL FILES CONVERTED FROM RASTER IMAGES--

Signed and Sealed this

Twenty-sixth Day of June, 2007

JON W. DUDAS
*Director of the United States Patent and Trademark Office*